United States Patent Office 3,136,727
Patented June 9, 1964

---

3,136,727
UNSYMMETRICAL ARYLOXY TRIPHOSPHO-
NITRILES
George M. Nichols, Pitman, N.J., assignor to E. I. du Pont de Nemours and Company, Wilmington, Del., a corporation of Delaware
No Drawing. Filed Nov. 3, 1961, Ser. No. 149,878
4 Claims. (Cl. 252—49.9)

This invention relates to novel reaction products and methods for their preparation. The primary product of the present invention is a pentaphenoxy-mono(phenoxyphenoxy)phosphonitrile having the structural formula

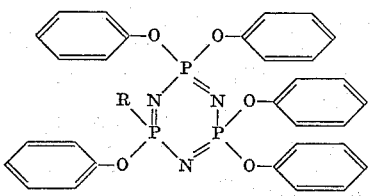

wherein R is either

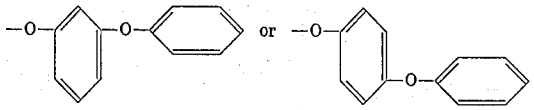

The novel chemical mixtures are provided by a process which comprises heating, at a temperature between about 60° C. and about 200° C., one mole of trimeric phosphonitrilic chloride simultaneously with an alkali salt of phenol and an alkali salt of either m-phenoxyphenol or p-phenoxyphenol, the molar ratio of said alkali salt of phenol to said alkali salt of phenoxyphenol being between about 4 to 1 and about 5 to 1, and the molar sum of said alkali salt of phenol and said alkali salt of phenoxyphenol being equal to at least six.

The above molar ratio of reactants is critical. If the molar ratio of the alkali salt of phenol to alkali salt of m- or p-phenoxyphenol is less than 4 to 1, the reaction product is not predominantly the desired product, but is predominantly tetraphenoxy-di(m-phenoxyphenoxy)triphosphonitrile, triphenoxy - tri(m-phenoxyphenoxy)triphosphonitrile or tetraphenoxy-di(p-phenoxyphenoxy)triphosphonitrile, and triphenoxy-tri(p-phenoxyphenoxy)triphosphonitrile. These reaction products are less fluid, i.e., they have a higher pour point, e.g., approximately 25° C., and, therefore, do not have so wide a liquid range as is desired. If the molar ratio of the alkali salt of phenol to alkali salt of m-phenoxyphenol or p-phenoxyphenol is more than 5 to 1, the reaction product is predominantly hexaphenoxytriphosphonitrile, a crystalline material at room temperature. If the molar sum of the alkali salt of phenol plus the alkali salt of m-phenoxyphenol or p-phenoxyphenol is less than six times the molar concentration of trimeric phosphonitrilic chloride, the replacement of chlorine by aryloxy groups is incomplete and the product does not have the desired thermal stability. The two isomers are very similar in their properties and characteristics and both are a liquid at 20° C. and 400° C., being thermally stable throughout this liquid range, and having hydrolytic stability. Accordingly, the compounds are useful not only as working fluids in applications requiring a liquid having a wide range between the freezing point and boiling point, but also as high-temperature lubricants, as chemical intermediates, and as plasticizers.

The compounds of this invention may be separated from the product mixture by conventional techniques. Fractional distillation can be used to separate the indicated compounds from substituted phosphonitriles having no or more than one m- or p-phenoxyphenoxy substituent, the pentaphenoxy - mono(m - phenoxyphenoxy)triphosphonitrile and the pentaphenoxy-mono(p-phenoxyphenoxy)triphosphonitrile having a boiling temperature of 327 to 329° C. at 0.2 mm. Hg pressure.

The alakli salts, e.g., sodium or potassium, of phenol and the m- or p-phenoxyphenol may be added to the reaction mixture as such or the salts may be prepared in situ. The preferred alkali salts are potassium phenoxide and potassium m- or p-phenoxyphenoxide.

The reaction is generally effected at a temperature between about 60° C. and about 200° C., with the preferred range being between 120 and 140° C., until the condensation reaction is essentially complete. Below a temperature of 60° C., the reaction rate is so low as to be economically unfeasible. Above a temperature of 200° C., the reaction, which is exothermic, is difficult to control.

The reaction may be effected with or without a solvent. However, since the reaction is exothermic, a water bath or cooling devices, such as coils, must be used if no solvent is present. Also a solvent is required in the work-up of the product. The preferred procedure is to have an inert solvent initially present. Suitable inert solvents are the aliphatic and aromatic hydrocarbon solvents which boil between 60 and 200° C., and dissolve trimeric phosphonitrilic chloride, e.g., the xylenes (o-, m-, p- or their mixtures), benzene, toluene, and petroleum ethers, and the halogenated aliphatic and aromatic hydrocarbons, such as chlorobenzene, sym-tetrachloroethane, and carbon tetrachloride. The amount of solvent used is not critical. Generally, the amount used is that necessary to facilitate control of the reaction, i.e., to absorb the heat of reaction, and to facilitate product work-up. In most instances, the amount of solvent used will range between 7 and 16 parts per part, by weight, of trimeric phosphonitrilic chloride. Of course, excess amounts of solvent are not recommended for economic reasons.

To recover the compounds of this invention from the reaction mixture, an inert solvent, if not present during the reaction, is added to facilitate the product work-up. In a preferred procedure, the desired product is recovered by washing the solvent solution of the reaction mixture with a dilute (approximately 5%, by weight) aqueous alkali hydroxide solution, e.g., potassium hydroxide, to dissolve alkali chloride, e.g., potassium chloride, formed as by-product of the reaction and to dissolve any unreacted phenol and alkali phenoxides, separating the organic phase containing the desired reaction product from the aqueous phase, rewashing the organic phase with aqueous alkali hydroxide solution and then with dilute (approximately 5% by weight) aqueous sodium sulfate solution to remove any alkali hydroxide remaining in the organic layer, the aqueous phases being discarded after each wash, drying the organic phase over anhydrous sodium sulfate, and treating the organic phase with activated charcoal to remove any color-imparting by-products, filtering the charcoal from the organic phase, removing the solvent from the organic phase, e.g., by distillation, and distilling at reduced pressure the liquid crude product to collect the desired liquid fraction boiling between 327 to 329° C. at 0.2 mm.

Although the above recovery precedure represents a simplified recovery procedure, variations may be introduced without departing from the scope of the invention. For example, the organic phase may be treated several times with the activated charcoal prior to the distillation which removes the solvent from the organic phase, or, if desired, the fraction boiling between 327 to 329° C. may be treated with activated charcoal to ensure the recovery of a colorless liquid product.

An alternative method involves the intermediate step of forming mixtures consisting principally of mono(p-halophenoxy)- or mono(m-halophenoxy)pentaphenoxy-triphosphonitrile as shown in Example 2. This method involves heating, under essentially the same conditions as above, one mole of trimeric phosphonitrilic chloride with a mixture of an alkali salt of phenol and a m- or p-halophenol, e.g., m- or p-chloro- or bromophenol (instead of the alkali salt of m- or p-phenoxyphenol), wherein the molar ratio of said alkali salt of phenol to halophenol salt is between about 4 to 1 and about 5 to 1, with the proviso that the molar sum of said alkali salt of phenol and halophenol salt is equal to at least six, and isolating the desired mixture containing the mono-(p-halophenoxy) or mono - (m - halophenoxy)pentaphenoxy-triphosphonitrile, and then phenoxylating by heating, at a temperature of 200 to 260° C., the aboxe mixture with an alkali salt of phenol in the presence of a catalyst, e.g. copper, to replace the halo substituent with a phenoxy substituent. The work-up of the desired product is the same as that described previously, except that the solvent required for work-up is added just prior to work-up and is not added initially in the reaction mixture as described previously. The catalyst is filtered from the reaction mixture after the reaction mixture is washed with dilute aqueous alkali hydroxide. The use of a catalyst, such as copper, is conventional in such a condensation between a hydroxyl group, e.g., of a phenol, and a halo compound. Suitable m- or p-halophenols in accordance with the invention are the m- or p-chloro- and bromophenols commercially available.

I have found that a highly satisfactory fluid for most applications is provided by the use of the fraction of the reaction products of the present process which boil at from about 316 to about 345° C. at 0.2 mm. pressure. This fraction contains over 50% by weight of either pentaphenoxy - mono(m-phenoxyphenoxy)triphosphonitrile or pentaphenoxy - mono(p-phenoxyphenoxy)triphosphonitrile and the remainder a mixture of hexaphenoxytriphosphonitrile and the tetraphenoxydiphenoxyphenoxy derivative. Because of the predominant proportion of the pentaphenoxy - mono(m-phenoxyphenoxy)triphosphonitrile or pentaphenoxy-mono(p-phenoxyphenoxy)triphosphonitrile present, the liquid range is essentially that of the pure compound and the thermal and hydrolytic stability remains essentially unchanged. Since this fraction obviously results in greater utilization of the reaction products, isolation of specific components is not usually required. Thus, in accordance with this invention, a liquid composition will comprise (A) at least 50% by weight of a compound of the structural formula

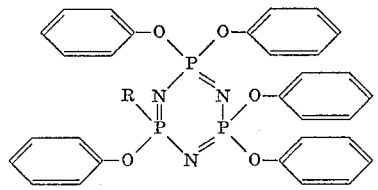

Where R is a member selected from the group consisting of

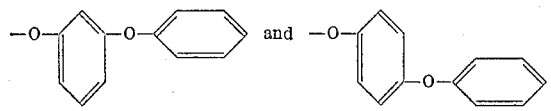

(B) from about 0 to about 25% by weight of hexaphenoxytriphosphonitrile, and (C) from about 0 to about 25% by weight of tetraphenoxydiphenoxytriphosphonitrile in which the two phenoxyphenoxy substituents on the phosphorus atoms are the same as the selected species of (A).

The invention may be illustrated by the following. The parts in the examples are parts by weight. The viscosity of the products in the examples was determined with calibrated Cannon-Manning Semi-Micro viscometers in constant temperature baths by standard techniques. The pour point of the products in the examples is the lowest temperature at which the material will flow in a $1\tfrac{3}{16}$-inch diameter tube. The pour points were determined according to ASTM Method D-97-57 (ASTM Standards, 1958 Edition, Part 7, p. 50).

*Example 1*

A mixture of 39 parts (0.11 mole) of phosphonitrilic chloride trimer, $(PNCl_2)_3$, 63 parts (0.67 mole) of phenol, 25 parts (0.134 mole) of m-phenoxyphenol, 45 parts (0.82 mole) of potassium hydroxide, and 344 parts of p-xylene was reacted for 6 hours at 140° C. in a 3-necked "Pyrex" flask fitted with a mechanical stirrer, thermometer, heating mantle, and water collector with a reflux condenser. During the reaction 18 parts of water was collected. The dark-brown reaction mixture was cooled and 523 parts of 5% aqueous potassium hydroxide solution was added with stirring. The p-xylene layer was separated from the mixture and rewashed with 523 parts of 5% aqueous potassium hydroxide solution. The p-xylene layer was washed twice with 520 parts of 5% sodium sulfate, allowed to stand over anhydrous sodium sulfate, treated twice with 10 parts of activated charcoal, and the p-xylene was removed by distillation. The red, viscous liquid crude product was distilled at reduced pressure to give a first fraction boiling up to 312° C. The first fraction, which consisted mainly of hexaphenoxytriphosphonitrile, was discarded because more than 25% of this crystalline material in the product has a deleterious effect. The second fraction collected was 60.5 parts of a liquid boiling between 312 and 370° C. at 0.2 mm. The distillation residue which contained triphosphonitriles having more than two phenoxyphenoxy substituents, was discarded. The liquid boiling between 312 and 370° C. was then treated at 120° C. with 3 parts of activated charcoal, filtered hot, and redistilled, yielding 48 parts of a pale-yellow viscous liquid boiling between 316 and 345° C. at 0.2 mm. This liquid was treated with 3 parts of activated charcoal and filtered hot to give 40 parts of a colorless viscous liquid. This liquid was a mixture consisting of, by weight, approximately 66.3% of pentaphenoxy-mono(m-phenoxyphenoxy)triphosphonitrile, approximately 22.7% of hexaphenoxytriphosphonitrile, and approximately 11.0% of tetraphenoxy - di(m - phenoxyphenoxy)triphosphonitrile. Elemental analysis of the material was as follows:

| | Percent C | Percent H | Percent N | Percent P |
|---|---|---|---|---|
| Calcd. for $P_3N_3(C_6H_5O)_5(C_6H_5OC_6H_4O)$ | 64.2 | 4.4 | 5.3 | 11.8 |
| Found | 63.4 | 4.4 | 5.2 | 12.4 |

This material had a pour point of 10° C., an index of refraction of $n_D^{25} = 1.6056$, a density of 1.25 g./ml. at 24° C., and a viscosity of 30.5 centistokes at 210° F. The infrared spectrum of this material is entirely consistent with the structure of the main component of the mixture, pentaphenoxy - mono(m - phenoxyphenoxy)triphosphonitrile. A strong band at 1160 cm.$^{-1}$ demonstrates the P=N stretching frequency. The strong band at 1270 cm.$^{-1}$ is characteristic of the

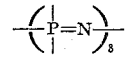

ring as demonstrated by the spectrum of hexaphenoxytriphosphonitrile. The strong bands at 1200 cm.$^{-1}$ and 950 cm.$^{-1}$ demonstrate the presence of P—O—C where the C is in an aromatic ring. The presence of the benzene rings in the phenoxy groups is demonstrated by (1) the weak band at 3050 cm.$^{-1}$ for C—H stretch of an aromatic compound, (2) the strong C=C band at 1600 cm.⁻¹, (3) the strong aromatic ring resonance band at 1500 cm.⁻¹, (4) the strong C—H out of plane deformation band at 765 cm.⁻¹, and (5) the strong aromatic mono-substitution band at 687 cm.⁻¹. The presence of the m-phenoxyphenoxy group is shown by the medium intensity band at 1130 cm.⁻¹.

When the above product having a boiling range between 316 and 345° C. at 0.2 mm. was subjected to any temperature up to at least 400° C. in an evacuated sealed "Pyrex" tube, the product remained stable, i.e., there was no significant change in appearance and physical properties for at least 10 hours. Heating was discontinued after this period only because no significant physical or chemical change occurred up to this time. This same product was heated in boiling aqueous 5% potassium hydroxide and was recovered unchanged, proving that the product was hydrolytically stable.

The above product mixture boiling between 316 and 345° C. at 0.2 mm. was redistilled conventionally, as follows, to collect the major component, pentaphenoxy-mono(m-phenoxyphenoxy)triphosphonitrile, boiling between 327 and 329° C. at 0.2 mm. A 35-part sample of the product mixture was distilled to collect 80.0 parts of a colorless liquid boiling between 290 and 327° C. at 0.2 mm. Hg. This liquid crystallized on cooling and, after recrystallization, was identified as hexaphenoxytriphosphonitrile by its melting point and infrared spectrum. A 23.2-part fraction of colorless liquid was then obtained boiling between 327 and 329° C. at 0.2 mm. Hg. By infrared analysis, this product was identified as pentaphenoxy - mono(m - phenoxyphenoxy)triphosphonitrile. The pour point of 10° C. for the purified compound is identical to that of the mixture in which it is the predominant component.

*Example 2*

The following example is an alternative method for preparing the substituted triphosphonitrile product having the desired boiling range via formation of mixtures consisting principally of the intermediates mono(p-halophenoxy)- or mono(m - halophenoxy)pentaphenoxytriphosphonitrile.

A mixture of 58 parts (0.17 mole) of phosphonitrilic chloride trimer, 94 parts (1.0 mole) of phenol, 34.6 parts (0.2 mole) of p-bromophenol, 67.3 parts (1.2 mole) of potassium hydroxide pellets, and 861 parts of p-xylene was charged to a flask as described in Example 1. The mixture was heated to the reflux temperature (approximately 143° C.) and maintained at this temperature for 4 hours. During this period, 27 parts of water was collected. The heterogeneous mixture was cooled to room temperature and 523 parts of 5% aqueous potassium hydroxide solution was added to the mixture with stirring. This mixture was filtered to remove a small amount of solid by-product and transferred to a separatory funnel for separation of the two layers. The upper (product) layer was then successively washed with 523 parts of 5% aqueous potassium hydroxide solution and two 520-part portions of 5% aqueous sodium sulfate solution, the aqueous layers being discarded in each case. The product solution was dried over anhydrous sodium sulfate and then treated with 15 parts of activated charcoal. After the solution was filtered, the p-xylene was distilled from the yellow solution, leaving 116.1 parts of a yellow, viscous liquid product. This product was analyzed to contain pentaphenoxy - mono(p-bromophenoxy)triphosphonitrile. A mixture of 112 parts (0.15 mole) of this product, 21.8 parts (0.18 mole) of potassium phenoxide, and 4 parts of copper powder as catalyst was charged to a single-necked flask having a thermometer well, heating mantle, magnetic stirrer, and reflux condenser. The mixture was heated at 235° C. for four hours, cooled to room temperature, and treated with a mixture of 440 parts of benzene and 523 parts of 5% aqueous potassium hydroxide solution. This mixture was filtered to remove the copper catalyst and then transferred to a separatory funnel. After the aqueous solution was removed, the benzene solution containing the product was washed successively with two 523-part portions of 5% aqueous sodium sulfate solution, the aqueous layers being discarded in each case. The product solution was dried over anhydrous sodium sulfate and then treated twice with 15 parts of activated charcoal. After the solution was filtered, the benzene was distilled from the brown solution, leaving 88.1 parts of a brown, viscous liquid crude product. This material was distilled and 59.2 parts of a viscous, yellow liquid boiling between 315 and 362° C. at 0.35 mm. was collected. This fraction was treated with 2 parts of activated charcoal at 100° C. and filtered through a sintered glass filter at 100° C., giving 53.7 parts of a pale yellow, viscous liquid. It was then redistilled, yielding 37 parts of a nearly colorless liquid boiling between 316 and 345° C. at 0.2 mm. Hg. This fraction was treated with 2 parts of activated charcoal as described above and 33.2 parts of colorless, viscous liquid product was obtained. The liquid product had the same physical and chemical properties and thermal stability as the product mixture prepared as described in Example 1. The infrared spectra of the product was similar to that of Example 1, except that the aromatic meta-substitution band at 1130 cm.⁻¹ found in the product of Example 1 was replaced by an aromatic para-substitution band at 835 cm.⁻¹. The infrared spectrum of this product thus confirms the structure of the main component of the product mixture in this example, pentaphenoxy-mono(p-phenoxyphenoxy)triphosphonitrile. Elemental analysis of this product was as follows:

| | Percent C | Percent H | Percent N | Percent P |
|---|---|---|---|---|
| Calcd. for P₃N₃(C₆H₅O)₅(C₆H₅OC₆H₄O) | 64.2 | 4.4 | 5.3 | 11.8 |
| Found | 61.9 | 4.4 | 5.3 | 12.5 |

A mixture consisting essentially of pentaphenoxy-mono(m-phenoxyphenoxy)triphosphonitrile may be prepared similarly according to the above procedure by using m-chloro- or bromophenol in lieu of p-bromophenol.

*Example 3*

When the procedure of Example 1 is followed and the amounts of the reactants shown in Example 1 are used, except that p-phenoxyphenol is used in lieu of m-phenoxyphenol, a mixture consisting, by weight, of greater than 50% of the desired pentaphenoxy-mono(p-phenoxyphenoxy)triphosphonitrile and less than 25% each of hexaphenoxytriphosphonitrile and tetraphenoxy - di(p-phenoxyphenoxy)triphosphonitrile is similarly obtained. This product exhibits the same boiling range and physical and chemical properties as the mixture in Example 2.

The present invention has been described in detail in the foregoing. However, it will be apparent that many variations may be introduced without departure from the scope of the invention. It is intended, therefore, to be limited only by the following claims.

What is claimed is:

1. A compound selected from the group consisting of pentaphenoxy - mono(m - phenoxyphenoxy)triphosphonitrile and pentaphenoxy-mono(p-phenoxyphenoxy)triphosphonitrile.

2. A mixture comprising (A) at least 50% by weight of a compound of the structural formula

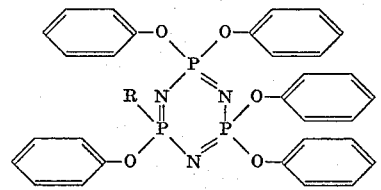

where R is a phenoxyphenoxy substituent selected from the group consisting of

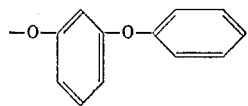 and 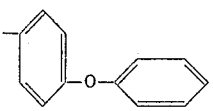

(B) from about 0 to about 25% by weight of hexaphenoxytriphosphonitrile, and (C) from about 0 to about 25% by weight of tetraphenoxydiphenoxyphenoxytriphosphonitrile.

3. Pentaphenoxy - mono(m - phenoxyphenoxy)triphosphonitrile.

4. Pentaphenoxy - mono(para - phenoxyphenoxy)triphosphonitrile.

References Cited in the file of this patent
UNITED STATES PATENTS

| | | |
|---|---|---|
| 2,192,921 | Lipkin | Mar. 12, 1940 |
| 2,214,769 | Lipkin | Sept. 17, 1940 |
| 2,225,285 | Moyle | Dec. 17, 1940 |